Jan. 27, 1970  J. F. TARABA  3,491,995
WORK HOLDING APPARATUS FOR TACK WELDING
Filed March 6, 1967  3 Sheets-Sheet 1

Joseph F. Taraba
INVENTOR.

BY Clarence A. O'Brien
and Harvey B. Jacobson
Attorneys

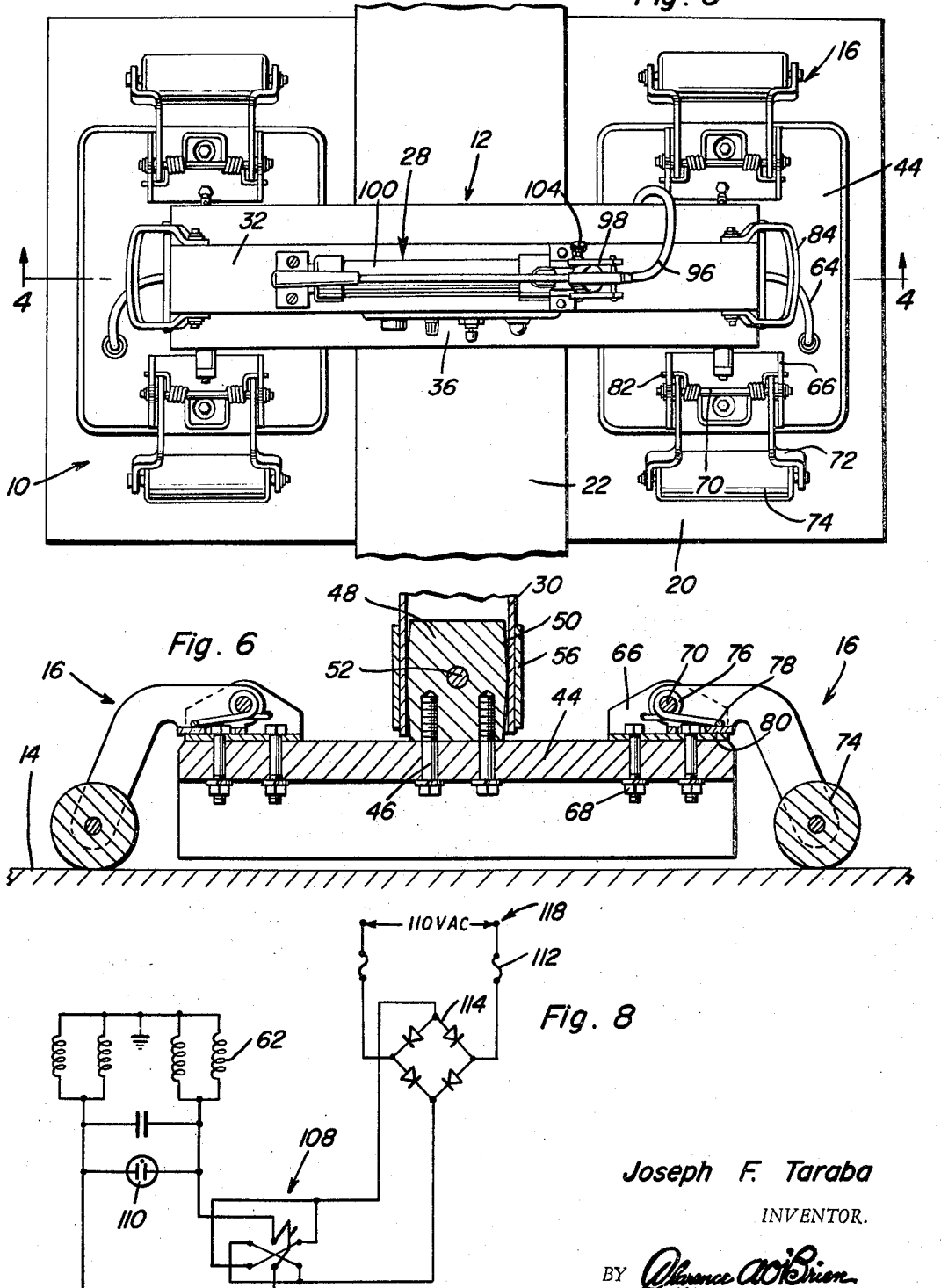

Jan. 27, 1970　　　　　J. F. TARABA　　　　　3,491,995
WORK HOLDING APPARATUS FOR TACK WELDING
Filed March 6, 1967　　　　　　　　　　　　　3 Sheets-Sheet 3
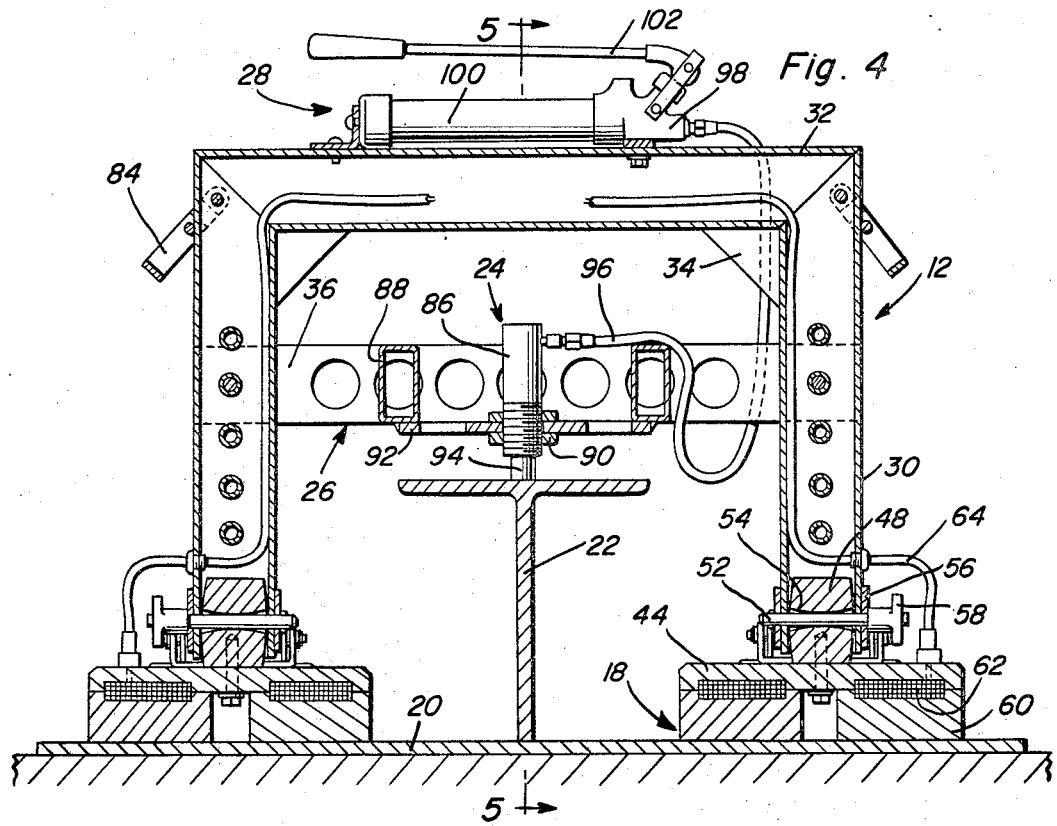
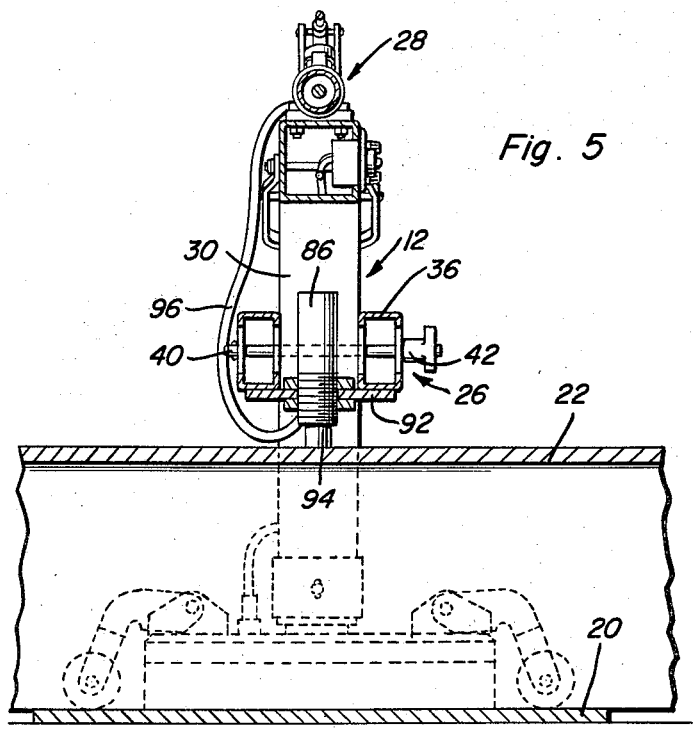
Joseph F. Taraba
INVENTOR.
BY *Clarence A. O'Brien*
*and Harvey B. Jacobson*
Attorneys United States Patent Office 3,491,995
Patented Jan. 27, 1970

3,491,995
WORK HOLDING APPARATUS FOR TACK WELDING
Joseph F. Taraba, P.O. Box 16237,
Portland, Oreg. 97216
Filed Mar. 6, 1967, Ser. No. 620,917
Int. Cl. B25b 11/00
U.S. Cl. 269—8                4 Claims

ABSTRACT OF THE DISCLOSURE

A mobile welding jig yieldably supported by castor wheels for movement to a desired location on a steel plate straddling a steel beam to which the plate is to be tack welded. Magnetic gripping devices anchor the jig frame to the steel plate while retracting the castor wheels so that the beam and plate are clamped together when a fluid power operated piston engages the beam. Electrical controls magnetize and de-magnetize the gripping devices.

Background of the invention

This invention relates to the welding of relatively large structural members and more particularly to a welding jig capable of being easily and accurately positioned for holding such structural members clamped together while performing the tack welding operation.

The welding jig of the present invention is particularly useful in connection with the welding of relatively large structural steel members or wherever the fastening of different varieties of steel shapes in long lengths to the surface of steel plates is required. A welding jig to serve the foregoing purpose, must have sufficient mobility and maneuverability despite its size and weight as well as the capability of rapidly and accurately clamping the workpieces together and disengaging the workpieces after the welding operation is completed.

The welding jig of the present invention meets the foregoing requirements and eliminates the need for "saddles" wedges, chipping hammers and grinders which create unpleasant working conditions and clutter the work area.

Summary of the invention

In accordance with the present invention, a welding jig is rendered mobile and maneuverable by means of caster wheel assemblies that yieldably support the jig frame in an elevated position above the supporting surface along which the jig is moved. When positioned at the desired location, magnetic gripping devices pivotally connected to tubular posts are energized so as to anchor the jig frame to the steel plate workpiece, the caster wheel assemblies being automatically displaced upwardly against a bias which is otherwise sufficient to hold the jig frame elevated above the supporting surface. Thus, the jig is automatically rendered mobile by the caster wheel assemblies as soon as the magnetic gripping devices are demagnetized by means of electrical controls mounted on the jig frame for this purpose.

The welding jig also features a fluid operated ram and holder assembly which is vertically adjustable on the jig frame so that the workpieces may be clamped together once the jig frame is anchored by means of the magnetic gripping devices aforementioned. The jig frame accordingly carries a manually operated pump through which fluid under pressure is generated in order to actuate the ram.

It will therefore be appreciated that the device of the present invention will effect a considerable savings in labor and time because of its mobility and the ease with which it clamps and disengages.

These together with other objects and advantages which will become subsequently apparent reside in the details of construction and operation as more fully hereinafter described and claimed, reference being had to the accompanying drawings forming a part hereof, wherein like numerals refer to like parts throughout.

Brief description of the drawings

FIGURE 3 is a top plan view of the apparatus at a work holding location.
FIGURE 4 is a side sectional view through the apparatus taken substantially through a plane indicated by section line 4—4 in FIGURE 3.
FIGURE 5 is a side sectional view taken substantially through a plane indicated by section line 5—5 of FIGURE 4.
FIGURE 6 is an enlarged partial sectional view taken substantially through a plane indicated by section line 6—6 of FIGURE 1.
FIGURE 8 is an electrical circuit diagram corresponding to the electrical power and control assembly for the magnetic gripping devices associated with the welding jig assembly.

Description of the preferred embodiment

Figure 1:
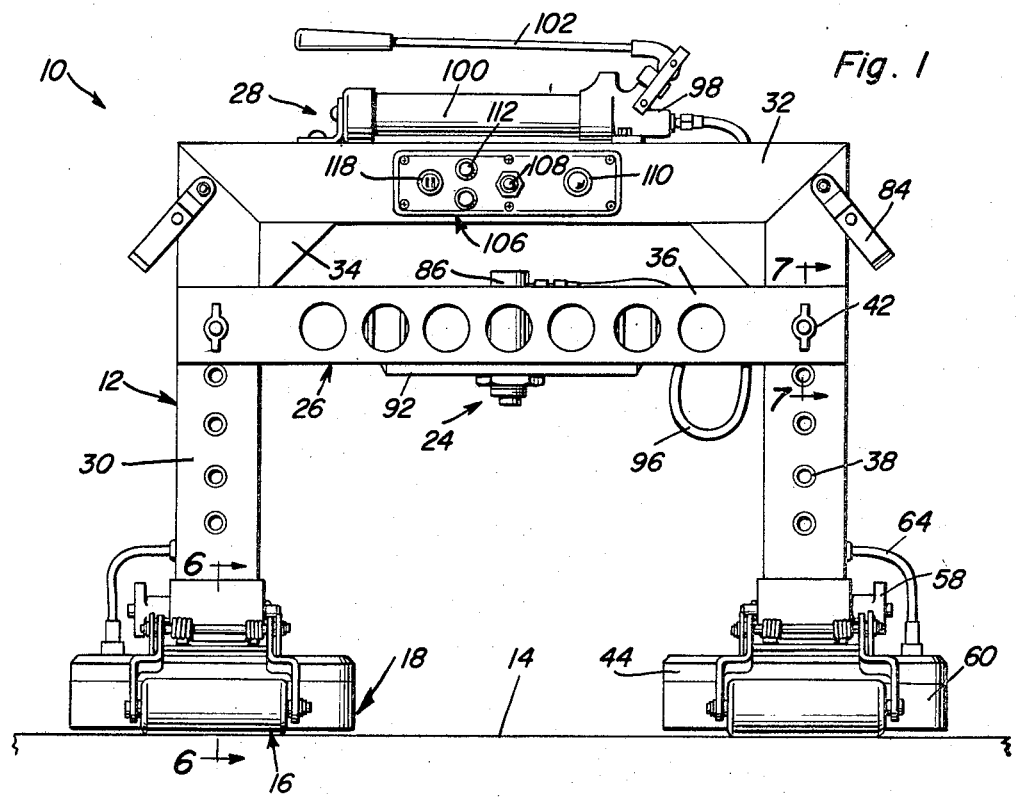
FIGURE 1 is a front elevational view of the welding jig assembly of the present invention.
Figure 2:
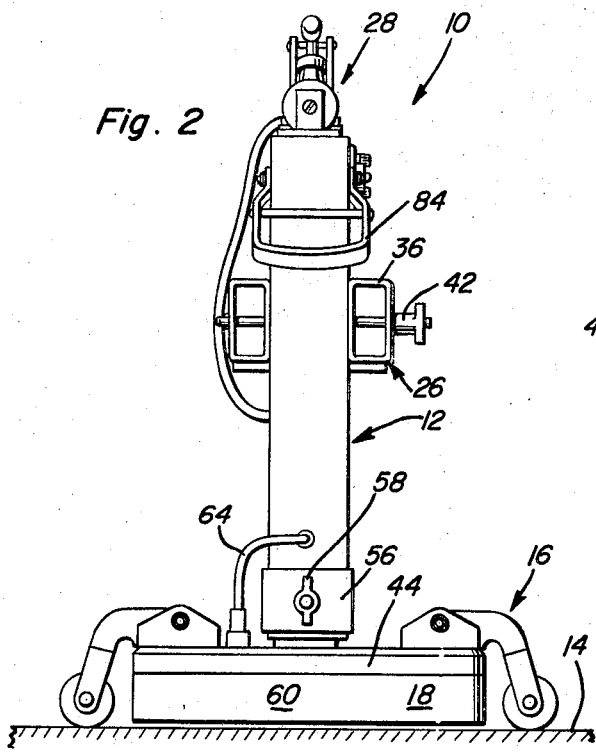
FIGURE 2 is a side elevational view of the apparatus shown in FIGURE 1.

Referring now to the drawings in detail, the welding jig assembly shown in its entirety in FIGURES 1, 2 and 3 is generally denoted by reference numeral 10. The assembly includes a frame generally referred to by reference numeral 12 adapted to be supported in an elevated position above a supporting surface 14 by means of a plurality of anti-friction caster wheel assemblies 16. Two pair of such caster wheel assemblies are shown connected to the bottom of the frame 12 which also mounts a pair of magnetic gripping devices 18. The jig frame is supported by the caster wheel assemblies 16 while the magnetic gripping devices 18 are inactive as shown in FIGURES 1–3. However, when the magnetic gripping devices are activated, the caster wheel assemblies automatically retract so that the jig frame becomes anchored to the supporting surface such as steel plate 20 as more clearly seen in FIGURE 4, straddling a steel beam 22. The steel beam may then be clamped to the plate 20 by means of a fluid operated piston asembly 24 supported by a holder 26 in adjustably spaced relation above the gripping devices 18. The fluid operated piston assembly is actuated by means of a fluid pressure generating pump 28 mounted on the jig frame.

Figure 7:
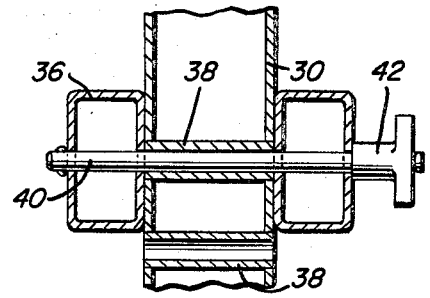
FIGURE 7 is an enlarged partial sectional view taken substantially through a plane indicated by section line 7—7 in FIGURE 1.

The jig frame 12 includes a pair of tubular post members 30, the upper ends of which are interconnected by a top frame member 32. The vertical dimensions of the tubular post members and the spacing therebetween is such as to accommodate a wide variety of different shapes and sizes of structural steel workpieces. Suitable braces 34 may interconnect the corners of the vertical post members and the top frame member, the frame being further rigidified by the tubular cross frame members 36 that form the holder 26 for the fluid piston assembly 24. The tubular post members 30 are therefore provided with a plurality of vertically spaced sleeves 38 that extend therethrough as more clearly seen in FIGURE 7. A pair of cross frame members 36 on either side of each vertical post are interconnected with the post in an adjusted position by means of pins 40 capable of being retracted upon removal of a releasable fastening device 42 of any suitable type. Thus, the cross frame members 36 may be lowered or raised to a position bringing the piston assembly 24 closely above the structural workpiece member 22 straddled by the frame. The frame is of course rendered mobile so that it may be moved to the position straddling the workpiece by means of the caster wheel assemblies 16 aforementioned which are secured to the lower ends of the post members 30 by means of the magnetic gripping devices 18. Each gripping device is accordingly provided with a mounting plate 44 secured by the fastener assemblies 46 to a connector member 48 that extends into the tubular post members 30 from the lower ends thereof as more clearly seen in FIGURE 6. The connector member 48 is provided with oppositely tapered sides 50 and is pivotally connected to the post member by pin 52 so as to accommodate limited angular displacement of the mounting plate 44 in one plane. Limited pivotal displacement in a perpendicular plane is also accommodated by the outwardly flared bore 54 through which the pin 52 extends as shown in FIGURE 4. The pin extends through openings in the post member 30 adjacent the lower end thereof aligned with the bore 54 and through an outer sleeve 56. The pin 52 may be removed for disassembly purposes by removal of a releasable fastening device 58 similar to the device 42 aforementioned in connection with the cross frame members 36. It will be apparent therefore, that the parts associated with the frame assembly 12 may be disassembled for replacement or repair purposes and also provide for adjustability accommodating supporting surfaces curvature as well as variations in size and shape of the workpieces to be clamped together.

Each of the mounting plates 44 associated with the two magnetic gripping devices 18, have a pair of magnetic elements 60 secured thereto and enclose a magnetizing coil 62 through which the gripping device is rendered operative to magnetically anchor the frame to the workpiece 20. Electrical energy is therefore brought to each of the magnetic gripping devices 18 through electrical cables that extend upwardly through the tubular post members 30 and into the tubular top frame member 32 as shown in FIGURE 4. Each mounting plate 44 also mounts a pair of caster wheel assemblies 16. As more clearly seen in FIGURE 6, each caster wheel assembly includes a channel shaped bracket 66 secured by the fastener assemblies 68 to the mounting plate 44 between the magnetic elements 60. A pivot shaft 70 is supported by the bracket 66 and pivotally mounts thereon a pair of support arms 72 interconnected by portion 80. The support arms overlie and extend outwardly and downwardly from the mounting plate 44, and rotatably mount adjacent the lower ends thereof an axially elongated roller 74 symmetrically aligned with the plate 44 as shown in FIGURES 1 and 3. A torsion coil spring 76 is mounted on the pivot shaft 70 having an intermediate portion 78 engaging the connecting portion 80 and terminal ends 82 extending through apertures in the brackets 66 secured to the mounting plate 44. Thus, the coil springs 76 urge the support arms and rollers 74 downwardly to positions as shown in FIGURE 6 holding the jig frame and the magnetic gripping devices elevated above the supporting surface 14 as to to render the apparatus mobile. The jig frame may also be lifted from one supporting surface to another by means of handles 84 which are pivotally connected to the frame adjacent the upper ends of the post members 30 as shown in FIGURES 1 and 4.

The piston assembly 24 includes a fluid cylinder member 86 which is disposed between the spacers 88 and interconnect the cross frame members 36 between the posts 30. The cylinder member is externally threaded so as to be threadedly mounted by the internally threaded nut 90 secured to the plate 92 which in turn is welded to the bottom of the cross frame members 36. A work piece engaging ram 94 extends from the lower end of the cylinder member to which fluid under pressure is supplied adjacent the upper end through a fluid conduit 96. The conduit 96 is connected through a valve assembly 98 to the discharge end of a manually operated pump 100 secured to the top of the top frame member 32. When the valve assembly 98 is opened by control 104 shown in FIGURE 3, fluid pressure may be generated by actuation of the hand lever 102 associated with the pump in order to supply fluid under pressure to the cylinder member 86 thereby extending the ram 94 into pressure engagement with the workpiece 22. The valve assembly 98 may then be closed to hold the pressure on the ram as the work pieces 20 and 22 are being welded. Pressure is relieved thereafter by opening of the valve assembly.

Also mounted on the top frame member 32, is an electrical control box assembly 106 which is provided with a three-position toggle switch 108, pilot lamp 110 and replaceable fuse devices 112. The electrical control box assembly is connected by the electrical cable 64 to the magnetic gripping devices 18 in order to effect magnetization and de-magnetization thereof. Referring therefore to FIGURE 8, it will be observed that the three position switch device 108 is movable in one direction from a central off position to a magnetizing position or in the other direction to a demagnetizing position by reversing connections to the coils 62 through the supply lines 122 and 124. Power may be supplied to the coils from the output terminals of a full wave rectifier 114 connected to an external source of A.C. current through the power receptacle 118. A filter capacitor 120 is connected across the D.C. lines 122 and 124 in parallel with the pilot lamp 110. Thus, if the gripping devices had been magnetized, the switch 108 must be displaced to its demagnetizing position so as to remove residual magnetic charge from the gripping devices before the switch is returned to its off position. Since the caster wheel assemblies 16 will automatically elevate and support the jig frame under the bias of the coil springs 76 when the gripping devices are demagnetized, the apparatus may be immediately wheeled to another location.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A mobile device for holding parts clamped together comprising, a frame having a pair of spaced tubular posts adapted to straddle one of said parts, roller means supporting the frame for wheeled movement in one direction, gripping means for selectively anchoring the frame to the other of said parts, yieldable mounting means overlying the gripping means and connecting the rollers thereto for retraction of the rollers in response to said anchoring of the frame, and power operated means mounted by the frame for engagement with said one of the parts when the frame is anchored to the other of the parts, said gripping means comprising a pair of electromagnetic devices, means extending into the posts and pivotally connecting said devices thereto for limited angular displacement in planes parallel to and perpendicular to said one direction, electrical power means mounted on the frame and switch means operatively connecting the power means to the electromagnetic devices for magnetizing and demagnetizing the same.

2. The combination of claim 1 wherein said yieldable mounting means comprises, a pair of support arms pivotally mounted on said gripping means, said rollers being carried by the support arms and torsion spring means for urging the rollers to position elevating the gripping means and the frame off the supporting surface.

3. The combination of claim 2 wherein said power operated means comprises, fluid piston means mounted by the frame between the posts in adjustably spaced relation above the gripping means having a ram engageable with said one of the parts, fluid pressure generating means mounted by the frame and connected to the piston means for selective extension and retraction of the ram.

4. In a mobile clamping device having a workpiece straddling frame, a pair of gripping assemblies supporting the frame and power operated work engaging means supported by the frame above and between the gripping assemblies, said frame including a pair of tubular posts having lower end portions connected to the gripping assemblies, each of said gripping assemblies including a mounting plate, a connector member secured to the mounting plate and projecting upwardly therefrom into the lower end portion of one of the tubular posts, pivot means extending through the connector member and the lower portion of said tubular post interconnecting the frame and the gripping assembly for limited pivotal displacement about perpendicular axes, a pair of magnetic elements secured to the mounting plate in spaced relation to each other below the connector member, a pair of angulated arm assemblies pivotally connected to the mounting plate above the magnetic elements in overhanging relation to the mounting plate, axially elongated rollers mounted by the arm assemblies about roller axes parallel to one of said perpendicular axes, and torsion spring means connected to the arm assemblies for transferring the load of the gripping assembly and the frame to the rollers, said rollers being symmetrically aligned with the mounting plate.

References Cited

UNITED STATES PATENTS 2,289,458   7/1942   Rodgers _____ 269—17 X

FOREIGN PATENTS 971,831   10/1964   Great Britain.

ROBERT C. RIORDON, Primary Examiner

LEON GILDEN, Assistant Examiner

U.S. Cl. X.R.

269—17